United States Patent
Naito

(10) Patent No.: US 8,270,758 B2
(45) Date of Patent: Sep. 18, 2012

(54) IMAGE PROCESSING DEVICE AND METHOD, PROGRAM RECORDING MEDIUM, AND IMAGING SYSTEM

(75) Inventor: Yukihiro Naito, Tokyo (JP)

(73) Assignee: Olympus Corporation, Tokyo (JP)

( * ) Notice: Subject to any disclaimer, the term of this patent is extended or adjusted under 35 U.S.C. 154(b) by 254 days.

(21) Appl. No.: 12/731,256

(22) Filed: Mar. 25, 2010

(65) Prior Publication Data

US 2010/0246991 A1    Sep. 30, 2010

(30) Foreign Application Priority Data

Mar. 31, 2009  (JP) ................................ 2009-086959

(51) Int. Cl.
*G06K 9/40*    (2006.01)
*G06K 9/36*    (2006.01)

(52) U.S. Cl. ......... 382/275; 382/260; 382/276; 348/533

(58) Field of Classification Search ........... 382/100–325
See application file for complete search history.

(56) References Cited

U.S. PATENT DOCUMENTS

| | | | | |
|---|---|---|---|---|
| 4,674,125 A * | 6/1987 | Carlson et al. | ................ | 382/303 |
| 5,218,435 A * | 6/1993 | Lim et al. | ................ | 375/240.16 |
| 5,526,446 A * | 6/1996 | Adelson et al. | ................ | 382/275 |
| 5,682,442 A * | 10/1997 | Johnston et al. | ................ | 382/239 |
| 5,708,693 A * | 1/1998 | Aach et al. | ................ | 378/62 |
| 5,852,681 A * | 12/1998 | Amaratunga et al. | ........ | 382/268 |
| 6,137,923 A * | 10/2000 | Takeo et al. | ................ | 382/308 |
| 6,173,084 B1 * | 1/2001 | Aach et al. | ................ | 382/260 |
| 6,233,362 B1 * | 5/2001 | Takeo et al. | ................ | 382/266 |
| 6,271,847 B1 * | 8/2001 | Shum et al. | ................ | 345/418 |
| 6,285,798 B1 * | 9/2001 | Lee | ................ | 382/260 |
| 6,823,086 B1 * | 11/2004 | Dolazza | ................ | 382/261 |
| 6,937,775 B2 * | 8/2005 | Gindele et al. | ................ | 382/254 |
| 7,181,084 B2 * | 2/2007 | Jostschulte | ................ | 382/260 |
| 7,181,086 B2 * | 2/2007 | Gindele et al. | ................ | 382/265 |
| 7,308,152 B2 * | 12/2007 | Ito | ................ | 382/260 |
| 7,729,510 B2 * | 6/2010 | Zakrzewski et al. | ........ | 382/100 |
| 7,848,560 B2 * | 12/2010 | Wang et al. | ................ | 382/132 |
| 2002/0034337 A1 * | 3/2002 | Shekter | ................ | 382/275 |
| 2003/0086105 A1 * | 5/2003 | Jostschulte | ................ | 358/1.9 |

FOREIGN PATENT DOCUMENTS

| | | |
|---|---|---|
| JP | 55-133179 A | 10/1980 |
| JP | 09-212623 A | 8/1997 |
| JP | 2001-057677 A | 2/2001 |

\* cited by examiner

*Primary Examiner* — Manav Seth
(74) *Attorney, Agent, or Firm* — Holtz, Holtz, Goodman & Chick, PC

(57) ABSTRACT

A number of invalid pixels at an outer peripheral part is reduced while suppressing an influence on an image quality such as discontinuity by pixel expansion, and suppressing increase in a number of processing pixels. When sequentially generating a plurality of reduced images having resolutions different from each other by sequentially performing a reduction process on an input image when realizing a noise reduction process using multiresolution transformation, the pixel expansion process of expanding the pixels at the outer peripheral part of the image of the reduced image is performed at least once before performing one of the reduction processes, and the reduced image after the pixel expansion process is further reduced to generate the plurality of reduced images.

12 Claims, 10 Drawing Sheets

IMAGE PROCESSING DEVICE AND METHOD, PROGRAM RECORDING MEDIUM, AND IMAGING SYSTEM

BACKGROUND OF THE INVENTION

1. Field of the Invention

The present invention relates to an image processing device and method, a program recording medium, and an imaging system.

This application is based on Japanese Patent Application No. 2009-086959, the content of which is incorporated herein by reference.

2. Description of Related Art

A noise reduction method using multiresolution transformation is known for a noise reduction method of reducing noise signals contained in image signals. The relevant method divides the image signal to signals of a plurality of frequency bands using methods of filter bank and Laplacian pyramid, performs some kind of noise reduction process on the signals of respective bands, and re-synthesizes such signals, which method has an advantage in that the noise reduction process of an intensity suited for each divided band can be performed.

FIG. 13 shows one configuration example for realizing the noise reduction process using multiresolution transformation by the Laplacian pyramid. An input image 100 is reduced after being subjected to a low pass filtering process in a filtering unit 101. Such process causes the image size to be halved in both the horizontal direction and the vertical direction. The reduced image is supplied to a filtering unit 111 of the next stage, and further reduced sequentially. The image reduced in the filtering unit 101 is enlarged to an original image size in an enlargement processing unit 102, and a band image signal is generated in a subtractor 103. The band image signal corresponds to a high-pass component shielded by the low pass filtering property used in the filtering unit 101. The noise reduction process is performed on the band image signal including a great amount of high-pass components in a noise reduction unit 104.

Similarly in the process of the second stage, a band image signal corresponding to the second stage is generated by the filtering unit 111, an enlargement processing unit 112 and a subtractor 113, and the noise reduction process is applied on the band image signal in a noise reduction unit 114. The noise reduction process is thus applied on the sequentially band-divided signals. The example shown in FIG. 13 is an example of the processes for a total of three stages.

The output of a noise reduction unit 124 in the lowest frequency band is added with the signal on the low-pass side by an adder 126, enlarged by an enlargement processing unit 115, and then transmitted to the process on the high-pass side. The signals are thus sequentially re-synthesized from the low-pass side, and the signal of the highest pass is ultimately added by an adder 106 to become an output image 130.

In the example shown in FIG. 13, the enlargement process is performed by the enlargement processing units 122 and 125 after the reduction process by the filtering unit 121 of the third stage, but such a reduction process and an enlargement process may be omitted.

Japanese Unexamined Patent Application, Publication No. 2001-57677 discloses a method of applying a noise reduction process (see e.g., Japanese Unexamined Patent Application, Publication No. 55-133179) using a filter with directivity to the noise reduction units 104, 114 and 124 in FIG. 13. Japanese Unexamined Patent Application, Publication No. 9-212623 discloses a method of performing a coring process of having a signal of lower than or equal to a threshold value to zero on the signal of each divided band using a wavelet transformation as frequency division.

The noise reduction method using multiresolution transformation described above has an advantage in that the noise reduction process of an intensity suited for each divided band can be performed, and in that the noise component at lower frequency can also be set as the target of noise reduction by increasing the number of stages of the multiresolution transformation and increasing the number of bands to be divided.

BRIEF SUMMARY OF THE INVENTION

The present invention adopts the following solutions.

An first aspect of the present invention is an image processing device including: a filtering unit of a plurality of stages for filtering an input image; a plurality of band image signal generating units for generating a plurality of band image signals having different frequency bands from each other from an output image of the filtering unit of a plurality of stages; a noise reduction processing unit for performing a noise reduction process of reducing a noise component contained in the plurality of band image signals generated by the band image signal generating units; and a plurality of image synthesizing units for synthesizing the plurality of band image signals subjected to the noise reduction process; wherein the image processing device includes a first pixel expansion unit for performing a pixel expansion process of expanding pixels at an outer peripheral part of an image input to one of the plurality of filtering units other than the filtering unit of a first stage, or an image output from one of the plurality of band image signal generating units.

A second aspect of the present invention is an imaging system including: an imaging unit for acquiring an image; and the image processing device of the first aspect for performing an image process with respect to the image signal acquired by the imaging unit.

A third aspect of the present invention is an image processing method including the steps of: performing filtering over plural times with respect to an input image; generating a plurality of band image signals having different frequency bands from each other from a plurality of output images obtained by the filtering of plural times; performing a pixel expansion process of expanding pixels at outer peripheral parts of the plurality of output images obtained by the filtering and at least one image of the plurality of band image signals; performing a noise reduction process of reducing a noise component contained in the plurality of band image signals; and synthesizing the plurality of band image signals subjected to the noise reduction process.

A fourth aspect of the present invention is an image processing program recording medium for causing a computer to execute the processes of: performing filtering over plural times with respect to an input image; generating a plurality of band image signals having different frequency bands from each other from a plurality of output images obtained by the filtering of plural times; performing a pixel expansion process of expanding pixels at outer peripheral parts of the plurality of output images obtained by the filtering and at least one image of the plurality of band image signals; performing a noise reduction process of reducing a noise component contained in the plurality of band image signals; and synthesizing the plurality of band image signals subjected to the noise reduction process.

DETAILED DESCRIPTION OF THE INVENTION

Embodiments of an image processing device, method, program, and an imaging system according to the present invention will be hereinafter described with reference to the drawings.

First Embodiment

Figure 1:
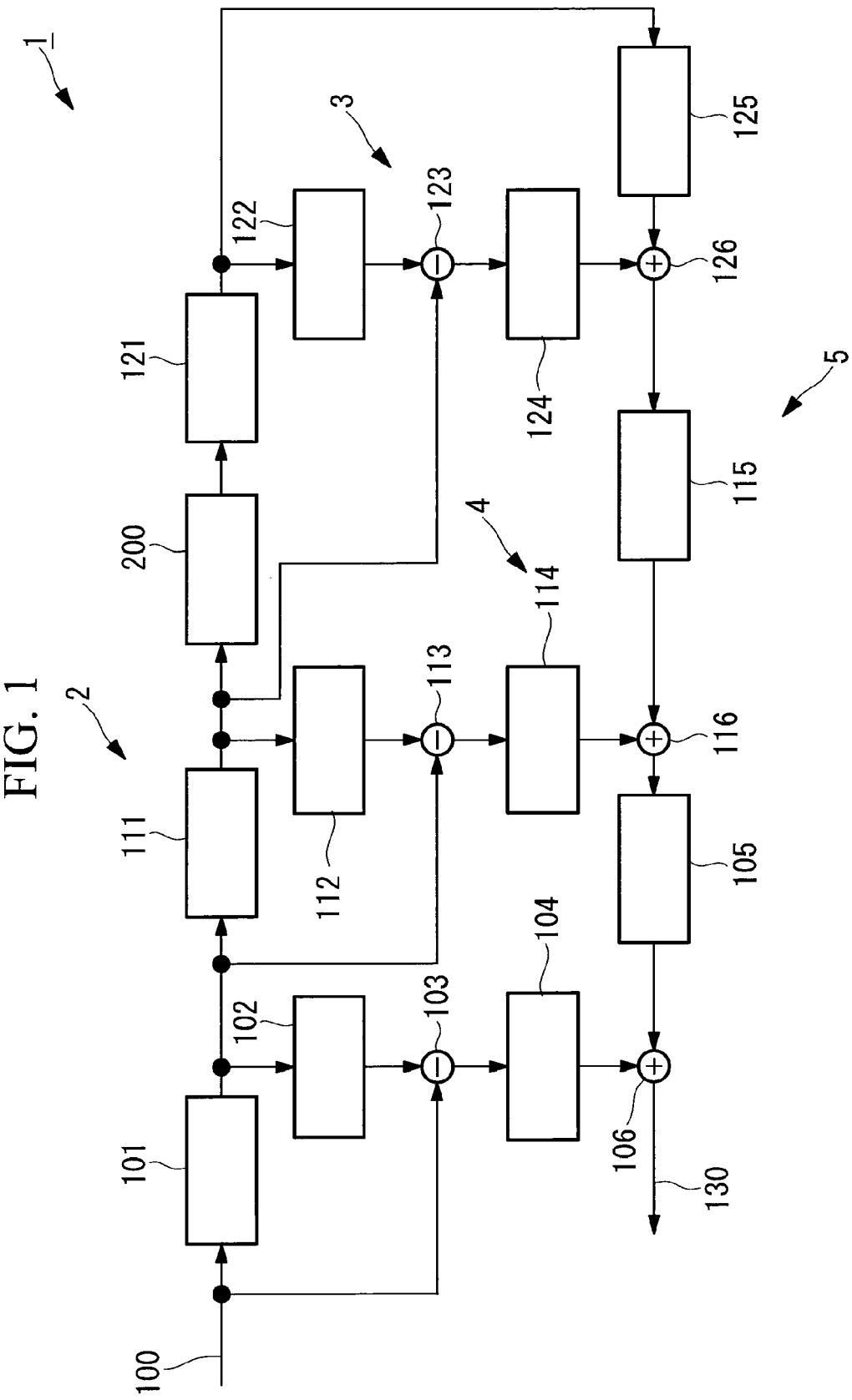
FIG. 1 is a block diagram showing a schematic configuration of an image processing device according to a first embodiment of the present invention.

FIG. 1 is a block diagram showing a schematic configuration of an image processing device according to a first embodiment of the present invention.

As shown in FIG. 1, an image processing device 1 according to the present embodiment includes a filtering image generating unit 2, a pixel expansion unit (first pixel expansion unit) 200, a band image signal generating unit 3, a noise reduction processing unit 4 and an image synthesizing unit 5 as main elements.

The filtering image generating unit 2 generates a plurality of images (reduced images), each having a resolution different from each other, from an input image 100. Specifically, the filtering image generating unit 2 includes filtering units 101, 111 and 121 of N stages (N is an integer greater than or equal to two), where a reduced image generated through filtering by the filtering unit of the pre-stage is input to the filtering unit of the post-stage, so that the plurality of reduced images each having a resolution different from each other are sequentially generated from the input image. In the present embodiment, a case of N=3 is shown. The reduced image is generated through filtering by the filtering unit, but the reduction process may not be performed in the filtering unit. For instance, a configuration of performing the low pass filtering but not performing the reduction process may be adopted.

The pixel expansion unit 200 is arranged on the input side of at least one of the filtering units 111 and 121 other than the filtering unit 101 of the first stage, and performs a pixel expansion process of expanding the pixels at the outer peripheral part of the image with respect to the reduced image output from the filtering unit of the pre-stage. In the present embodiment, the pixel expansion unit 200 is arranged on the input side of the filtering unit 121 of the final stage, and performs the pixel expansion process of expanding the pixels at the outer peripheral part of the image with respect to the reduced image output from the filtering unit 111. Herein, the phrase "expanding pixels" means newly setting pixel values to a region on the outer side of the image using the pixel values of the pixels in the image, thereby enlarging the region where the pixel values exist.

The band image signal generating unit 3 generates band image signals, each having a different band from each other, from each of the plurality of reduced images generated by the filtering image generating unit 2. Specifically, the band image signal generating unit 3 includes enlargement processing units 102, 112 and 122 and subtractors 103, 113 and 123 respectively arranged in correspondence to each of the filtering units 101, 111 and 121.

The noise reduction processing unit 4 reduces the noise component contained in each band image signal generated by the band image signal generating unit 3. Specifically, the noise reduction processing unit 4 includes noise reduction units 104, 114 and 124 respectively arranged in correspondence to each of the filtering units 101, 111 and 121.

The image synthesizing unit 6 synthesizes each band image signal subjected to the noise reduction process. Specifically, the image synthesizing unit 6 includes enlargement processing units 105, 115 and 125 and adders 106, 116 and 126 respectively arranged in correspondence to each of the filtering units 101, 111 and 121.

In the image processing device 1 having the above configuration, the input image 100 is reduced after the low pass filtering process in the filtering unit 101. Such a process causes the image size to be halved in both the horizontal direction and the vertical direction. The reduced image is supplied to the filtering unit 111 of the next stage, and further reduced. In this case, the output of the filtering unit 111 contains invalid pixels.

For instance, if the size of the input image 100 is 256×256, and the filter size of the filtering units 101 and 111 is 5×5, respectively, two pixels worth at the outermost periphery in the image of 256×256 become the invalid pixels by the filtering process of the first stage. The image size becomes 126×126 by further reducing the image where the invalid pixels are reduced. Two pixels worth at the outermost periphery in the image of 126×126 become the invalid pixels by the filtering process of the second stage. The image size becomes 61×61 by further reducing the image where the invalid pixels are reduced.

In the present embodiment, new invalid pixels are prevented from being generated in the filtering unit 121 by expanding the pixels at the outermost peripheral part by means of the pixel expansion unit 200 with respect to the output of the filtering unit 111. For instance, if the filter size of the filtering unit 121 is 5×5, the pixel expansion unit 200 expands the image of 61×61 by two pixels at the outer peripheral part so as to become 65×65.

The operation of the pixel expansion unit 200 will be described in detail below using FIGS. 2 and 3.

Figure 2:
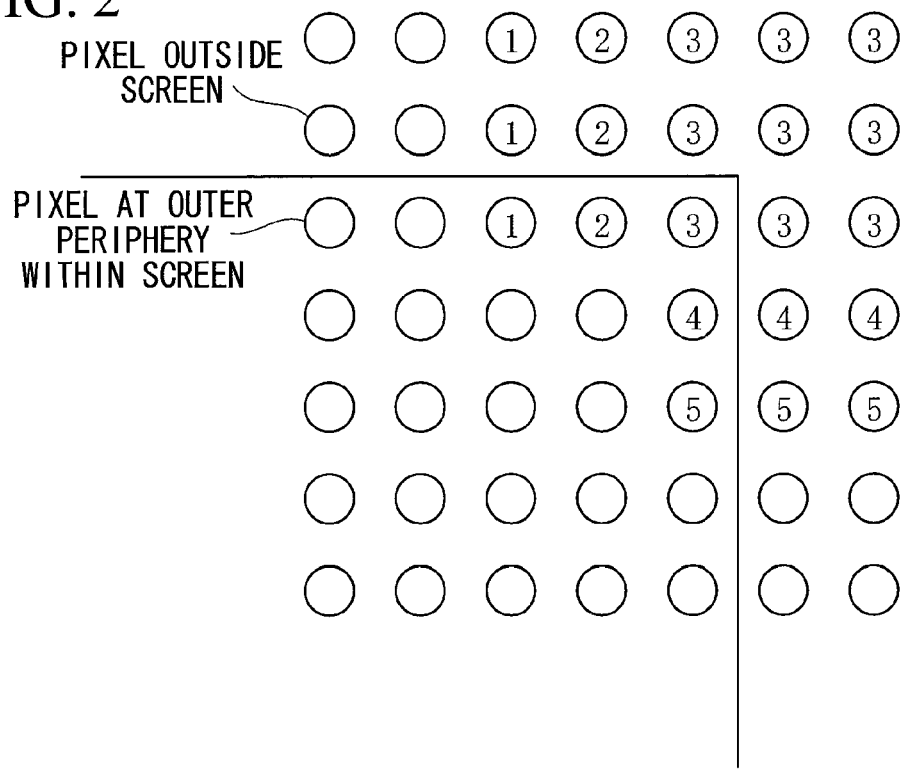
FIG. 2 is a view explaining the operation of a pixel expansion unit according to the first embodiment of the present invention.
Figure 3:
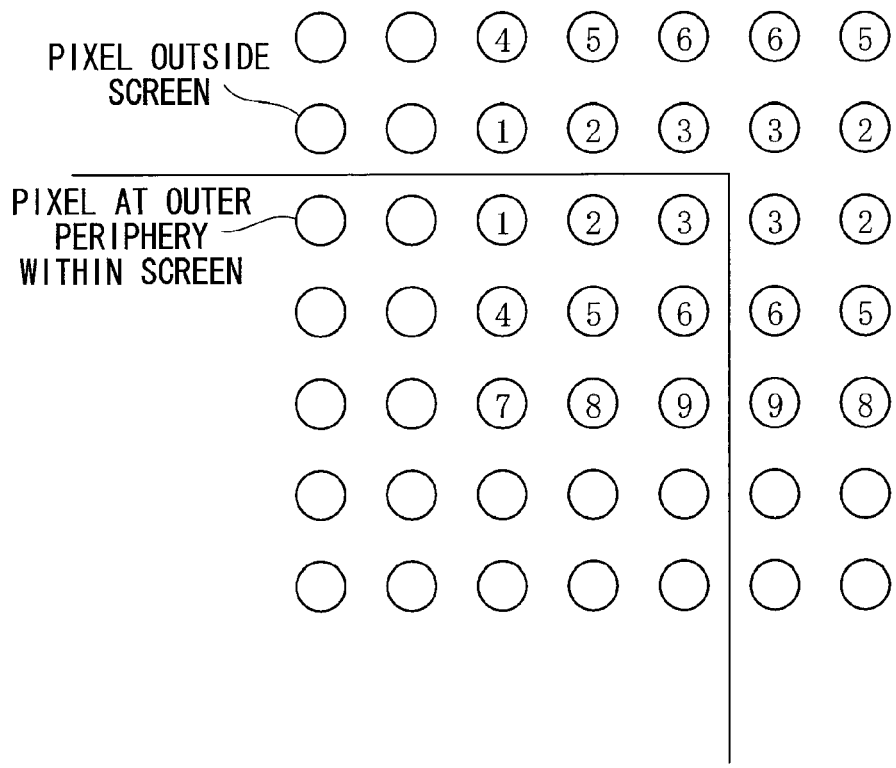
FIG. 3 is a view explaining an operation of a pixel expansion unit according to the first embodiment of the present invention.

According to the method of expanding the pixels at the outer peripheral part shown in FIG. 2, the pixel value to be expanded is made the same as the pixel closest in distance among the pixels at the outermost peripheral part. The pixels denoted with the same number in the pixels indicated as 1 to 5 in FIG. 2 respectively have the same pixel values, and shown is a state where the pixel value outside the screen to be expanded is the pixel value of the pixel closest in distance among the pixels at the outermost peripheral part within the screen.

The method of expanding the pixels is not limited to the method shown in FIG. 2. For instance, FIG. 3 shows an expansion method wherein the pixel outside the screen and the pixel within the screen are in a mirror-image relationship with respect to a boundary portion.

Returning back to FIG. 1, the outputs of the filtering units 101, 111 and 112 are respectively subjected to the enlargement process by the enlargement processing units 102, 112 and 122 and the subtraction process by the subtractors 103, 113 and 123 to thereby generate a band image signal of each band. The band image signals are respectively subjected to the noise reduction process in the noise reduction units 104, 114 and 124. The content of the noise reduction process includes a coring process of having the signal where absolute value of the band image signal is smaller than or equal to a threshold value to 0 (zero), or the like, but is not limited to such a process.

The band image signals subjected to the noise reduction process are sequentially re-synthesized from the low-pass side in the image synthesizing unit 5 to generate an output image 130.

In the present embodiment, the pixel expansion unit 200 is arranged on the input side of the filtering unit 121 of the final stage to prevent new invalid pixels from being generated in the filtering process of the third stage, as described above. The advantages of arranging the pixel expansion unit 200 at such a position, and performing the pixel expansion process only on the reduced image (multiresolution image) of lowest pass will be hereinafter described.

Normally, the pixel value expanded by pixel expansion differs from the original correct pixel value, and the difference thereof adversely affects the image quality such as discontinuity. However, if a rather strong low pass filter is used in the filtering process before the reduction process to suppress alias influences, the low-pass reduced image that has passed such a low pass filter is expected to be a smooth image with little change.

Therefore, if the pixels at the outer peripheral part are expanded with respect to such a low-pass reduced image, the difference with the original correct pixel value is expected to be small. In other words, the influence on the image quality can be suppressed small by performing pixel expansion only on the low-pass reduced image.

The effect of reducing invalid pixels by pixel expansion becomes greater than the effects in the filtering unit arranged at the pre-stage as the reduction rate on the input image becomes higher for the filtering unit arranged more at the post-stage. In FIG. 1, for example, the invalid pixels of the output image 130 can be reduced by two pixels when the pixel expansion worth two pixels is performed on the input side of the filtering unit 101. In the present embodiment, the invalid pixels of the output image 130 can be reduced by eight pixels in a case where the pixel expansion worth two pixels is performed on the low-pass reduced image on the input side of the filtering unit 121.

Furthermore, since useless calculation process in the filtering units 101 and 111 can be omitted by performing the pixel expansion immediately before the filtering unit 121, which causes an invalid pixel generation, rather than performing the pixel expansion on the input image, the adverse affect on the processing speed also can be alleviated.

Therefore, according to the image processing device 1 of the present embodiment, new invalid pixels are prevented from being generated in the filtering unit 121 by expanding the pixels at the outermost peripheral part in the pixel expansion unit 200 with respect to the output of the filtering unit 111. Thus, the number of invalid pixels at the outer peripheral part can be reduced while suppressing the influence on the image quality such as discontinuity by the pixel expansion and while suppressing the increase in the number of processing pixels in the noise reduction method using multiresolution transformation.

The configuration of processing the input image 100 and outputting the output image 130 has been described in the present embodiment, but the input image 100 may be a block image of a case where a raw image is divided into blocks, or may be the raw image itself. If the input image 100 is the raw image itself, the effect of suppressing discontinuity at the block boundary cannot be obtained as with the case where the raw image is divided into blocks, but the effect of suppressing degradation of the image quality at the outer peripheral part of the raw image can be obtained.

Furthermore, as shown in FIG. 1, the input of the enlargement processing unit 112 is not the output of the pixel expansion unit 200 in the present embodiment, but such input may be the output of the pixel expansion unit 200 if invalid pixels are generated in the process by the enlargement processing unit 112.

Second Embodiment

A second embodiment of the present invention will be described with reference to FIG. 4.

Figure 4:
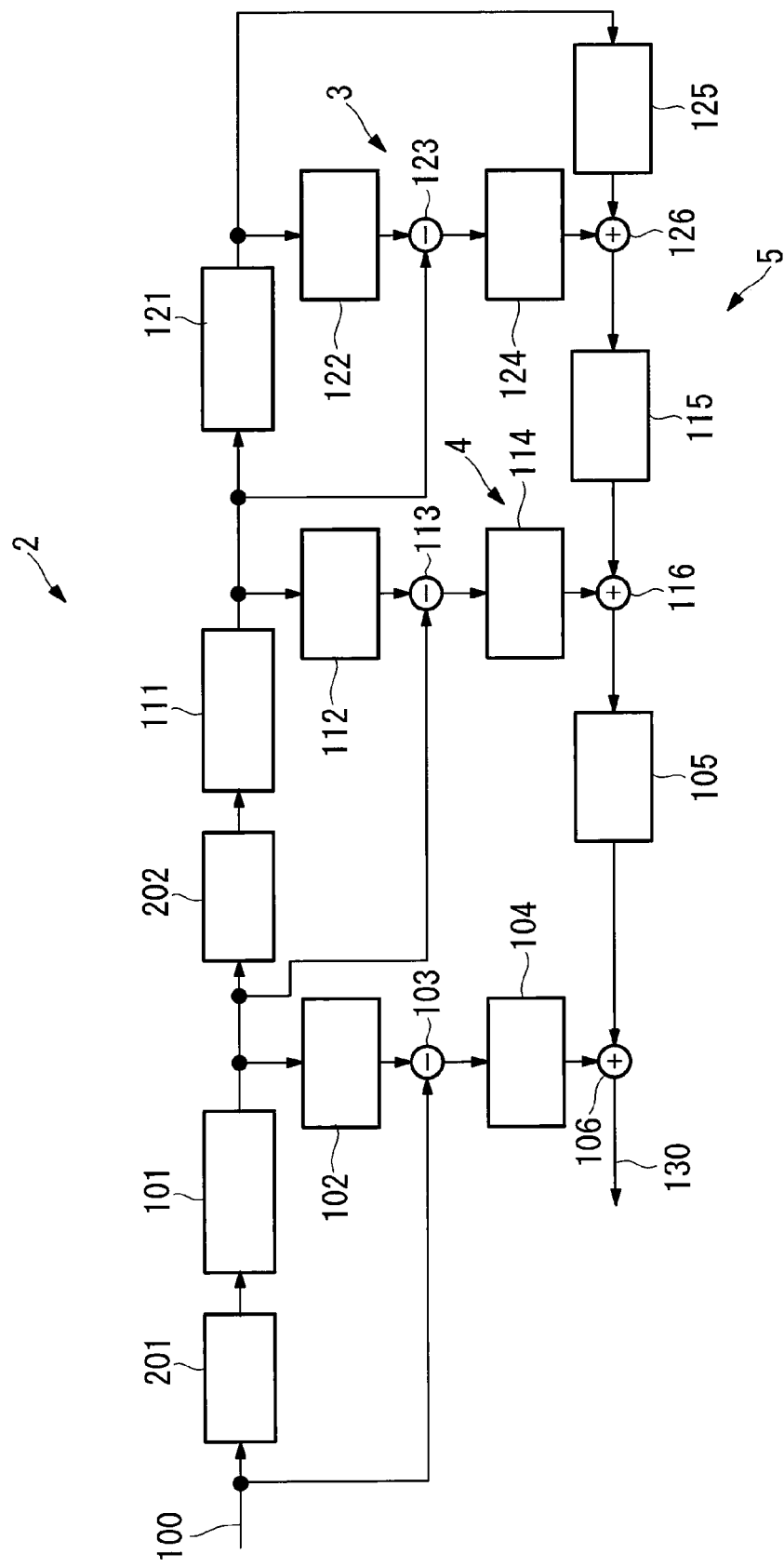
FIG. 4 is a block diagram showing a schematic configuration of an image processing device according to a second embodiment of the present invention.

FIG. 4 is a block diagram showing a schematic configuration of an image processing device according to the present embodiment. As shown in FIG. 4, the image processing device according to the present embodiment differs from the image processing device according to the first embodiment in the arrangement position of the pixel expansion unit 200.

Specifically, the first embodiment addresses the invalid pixels that generate in the filtering unit 121, and has the pixel expansion unit 200 arranged on the input side of the filtering unit 121 of the final stage to prevent new invalid pixels from being generated. In the present embodiment, pixel expansion units 201 and 202 are arranged on the input side of the filtering units 101 and 111 other than the final stage, respectively, to reduce the number of invalid pixels. In regards to the image processing device of the present embodiment, the description on the aspects common with the first embodiment is omitted and only the differing aspects will be described.

First, the input image 100 has the pixels at the outermost peripheral part expanded in the pixel expansion unit 201. Invalid pixels thus do not generate in the filtering unit 101. Furthermore, the output of the filtering unit 101 has the pixels at the outermost peripheral part expanded in the pixel expansion unit 202, so that invalid pixels do not generate in the filtering unit 111. The operations of the pixel expansion units 201 and 202 are similar to the operation of the pixel expansion unit 200 shown in FIG. 1.

A case where the size of the input image is 256×256, and the filter size of the filtering unit 101, 111 and 121 is 5×5 will be described below. The pixels at the outermost peripheral part are expanded by two pixels by the pixel expansion unit 201 so that the image size becomes 260×260. The image size becomes 256×256 by the filtering process of the first stage, and remains the same size as the input image. The image size becomes 128×128 by reducing the image. The pixels at the outermost peripheral part are expanded by two pixels by the pixel expansion unit 202 so that the image size becomes 132×132. The image size becomes 128×128 by the filtering process of the second stage, and the image size becomes 64×64 by reduction. The image size becomes 60×60 since the two pixels at the outermost periphery become invalid pixels by the filtering process of the third stage. The subsequent configurations are similar to those of the first embodiment, and thus will be omitted.

In the present embodiment, the two pixel expansion units 201 and 202 are arranged, which is disadvantageous from the standpoint of hardware scale, but a number of reductions close to that of the first embodiment can be obtained, which is advantageous from the standpoint of reducing the invalid pixels, compared to the image processing device in the first embodiment. The adverse affect with respect to the processing speed can be alleviated compared to a case of performing a wide pixel expansion only with respect to the input image 100 by performing a minimum pixel expansion immediately before the filtering units 101 and 111 that cause generation of invalid pixels.

Furthermore, great influence of discontinuity and the like is a concern in the present embodiment since the pixel expansion is carried out in the high-pass image signal, unlike the first embodiment. However, the influence of pixel expansion does not directly affect the output image 130 through the adders 116 and 106 since the invalid pixels are purposely generated in the filtering process of the third stage and the image size is reduced in the present embodiment.

The pixels expanded in the pixel expansion units 201 and 202 are input to the process of the third stage through the filtering process of the first stage and the second stage, and thus the influence of discontinuity and the like can be alleviated more than a case where the pixel expansion is performed on the input side of the filtering unit 121 of the third stage as in the first embodiment.

The arrangement of the pixel expansion unit is not limited to the arrangement according to the first or second embodiment. For instance, the pixel expansion unit may be arranged on the input side of all filtering units, or the pixel expansion unit may be arranged only on the input side of the filtering unit 111 of the second stage.

If the pixel expansion unit is arranged only on the input side of the filtering unit 111 of the second stage, the pixel expansion needs to be widely performed so that the invalid pixels are prevented from being generated in both filtering units 111 and 121. Therefore, there is a drawback that the number of processing pixels increases compared to a case where the pixel expansion unit 200 is arranged on the second stage and the third stage. However, it is advantageous from the standpoint of hardware scale since a place for inserting the pixel expansion unit 200 is small.

Third Embodiment

A third embodiment of the present invention will be described using FIG. 5.

In the first embodiment described above, the problem of invalid pixel generation in the filtering unit 121 is addressed, and the new invalid pixels are prevented from being generated by inserting the pixel expansion unit 200 on the input side of the filtering unit 121 of the final stage. However, the invalid pixels may generate in the noise reduction processing unit 4. If the noise reduction process executed by the noise reduction processing unit 4 is a simple coring process, the new invalid pixels do not generate. However, if a filtering process having directivity (see e.g., patent document 2) is adopted for the noise reduction process, the invalid pixels corresponding to the size of the filter to be used generate.

To respond to such a case, a pixel expansion unit (second pixel expansion unit) 300 for performing a pixel expansion process is arranged on the input side of the noise reduction processing unit 4, and the generation of invalid pixels is suppressed by expanding the band image signal at the outer peripheral part in the present embodiment.

The description on the aspects common with the image processing device according to the first embodiment in the image processing device of the present embodiment is simplified, and the differing aspects will be mainly described.

The input image 100 is sequentially reduced after the low pass filtering process in the filtering units 101, 111 and 121. Each reduced image is subjected to the enlargement process by the enlargement processing units 102, 112 and 122 and the subtraction process by the subtractors 103, 113 and 123, thereby generating a band image signal of each band. The band image signals are respectively subjected to the noise reduction process in each noise reduction unit 104, 114 and 124 of the noise reduction processing unit 4. The content of noise reduction process includes a filtering process having directivity, but is not limited to such a method.

In the present embodiment, the pixel expansion unit 300 is arranged on the input side of the noise reduction unit 124 corresponding to the filtering unit 121 of the third stage. If the size of the filter to be used in the noise reduction unit 124 is 5×5, the pixel expansion unit 300 operates to expand the pixels at the outermost peripheral part by two pixels to the periphery, so that new invalid pixels are not prevented from being generated in the noise reduction unit 124. The expansion method may be a simple expansion as shown in FIG. 2, or may be an expansion where mirror-image relationship is obtained with respect to the boundary portion as shown in FIG. 3, similar to the first embodiment.

Each band image signal subjected to the noise reduction process is sequentially re-synthesized from the low-pass side by the enlargement processing units 125, 115 and 105 and the adders 126, 116 and 106 to become the output image 130.

According to the foregoing image processing device of the present embodiment, the pixel expansion unit 300 for expanding the pixels of the band image signal corresponding to the filtering unit 121 of the third stage is arranged, and the band image signal enlarged by the pixel expansion unit 300 is input to the noise reduction unit 124, so that generation of new invalid pixels can be suppressed in the noise reduction process of the noise reduction unit 124.

Therefore, the influence on the image quality such as discontinuity by the pixel expansion can be suppressed by performing the pixel expansion only in the low-pass band image signal, and the processing load by the calculation process can be reduced by suppressing the increase in the number of processing pixels.

In the present embodiment, the pixel expansion unit 300 is arranged only on the input side of the noise reduction unit 124 corresponding to the filtering unit 121 of the third stage, but in addition thereto or in place thereof, the pixel expansion unit 300 may be arranged on the input side of each of the noise reduction units 114 and 104. The pixel expansion unit may also be arranged on the input side of each of the filtering unit 101, 111 and 121 in combination with the first or second embodiment described above.

Fourth Embodiment

A fourth embodiment of the present invention will be described below using FIG. 6.

An image processing device of the present embodiment differs from the image processing device according to the first embodiment described above in that the pixel expansion unit 300 is further arranged on the input side of the noise reduction unit 114.

The description on the aspects common with the first embodiment in the image processing device of the present embodiment is simplified, and the differing aspects will be mainly described.

Figure 6:
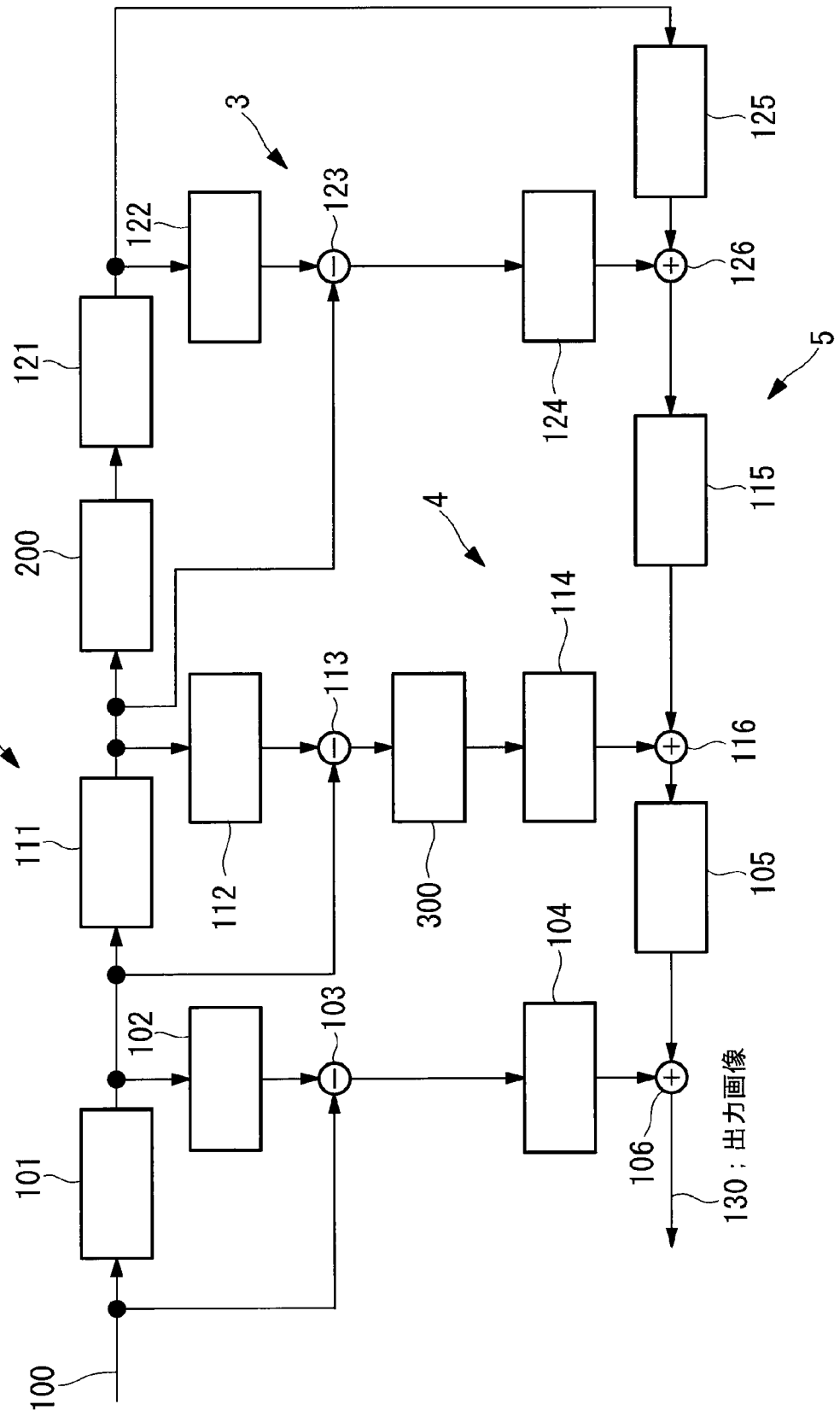
FIG. 6 is a block diagram showing a schematic configuration of an image processing device according to a fourth embodiment of the present invention.

In the image processing device shown in FIG. 6, the input image 100 is sequentially reduced after the low pass filtering process in the filtering units 101, 111 and 121. The reduced image created by the filtering unit on the post-stage is an image of lower resolution.

In the present embodiment, the pixel expansion unit 200 is arranged on the input side of the filtering unit 121 of the final stage, so that new invalid pixels are not prevented form being generated in the filtering unit 111.

The reduced image created by each of the filtering units 101, 111 and 121 is input to the enlargement processing units 102, 112 and 122 and the subtractors 103, 113 and 123, respectively, and the band image signal of each band is created.

Each band image signal has the noise component reduced by each of the noise reduction units 104, 114 and 124, and thereafter, synthesized by the image synthesizing unit 5 to create the output image 130. In this case, the invalid pixels generated in the noise reduction processing unit 114 can be suppressed since the pixel expansion unit 300 is arranged on the input side of the noise reduction unit 114.

Whether or not the invalid pixels generate depends on the noise reduction process adopted in the noise reduction unit. For instance, the invalid pixels are not generated if the noise reduction process such as coring is adopted, and the invalid pixels are generated if the noise reduction process using the filter having directivity is adopted.

Therefore, the noise reduction process adopted by each of the noise reduction units 104, 114 and 124 is reviewed for the pixel expansion unit 300, where the pixel expansion unit 300 is arranged on the input side of the noise reduction unit, and the pixel expansion process of expanding the number of pixels corresponding to the invalid pixels generated by the subsequent noise reduction process is preferably performed if the noise reduction process that generates invalid pixels is adopted.

According to the foregoing image processing device of the present embodiment, the pixel expansion unit 200 is arranged on the input side of at least one filtering unit 121 of the plurality of filtering units, and the pixel expansion unit 300 is arranged on the input side of at least one noise reduction unit 114 of the plurality of noise reduction units, so that the invalid pixels generated through the reduction process by the filtering unit can be suppressed and the invalid pixels generated through the noise reduction process can also be suppressed.

Fifth Embodiment

A fifth embodiment of the present invention will be described below.

In the first embodiment, the problem of generation of invalid pixels in the filtering unit is addressed, and new invalid pixels are prevented from being generated by arranging the pixel expansion unit 200 on the input side of the filtering unit 121 of the final stage. The adverse affect on the image quality can be suppressed small if the pixel expansion is performed only on the low-pass image signal.

However, if strong edge components exist at the outer peripheral part, for example, an unignorable error may occur between the original correct pixel value and the pixel value obtained by the pixel expansion. Such an error component may mix into the band image signal through subtraction by the subtractor 123 as an anti-error component.

If the intensity of noise reduction by the noise reduction unit 124 is sufficiently weak, the anti-error component returns to the image by the adder 126 without disappearing by noise reduction, and hence the error that occurred by the pixel expansion can be canceled.

If the intensity of noise reduction by the noise reduction unit 124 is strong and a part of the anti-error component disappears with noise, the error component remains in the image even after addition by the adder 126.

To respond to such a problem, a noise reduction intensity control unit 400 is arranged at the post-stage of the noise reduction unit 124 to suppress the residual of the error component that occurred by pixel expansion in the present embodiment.

Figure 7:
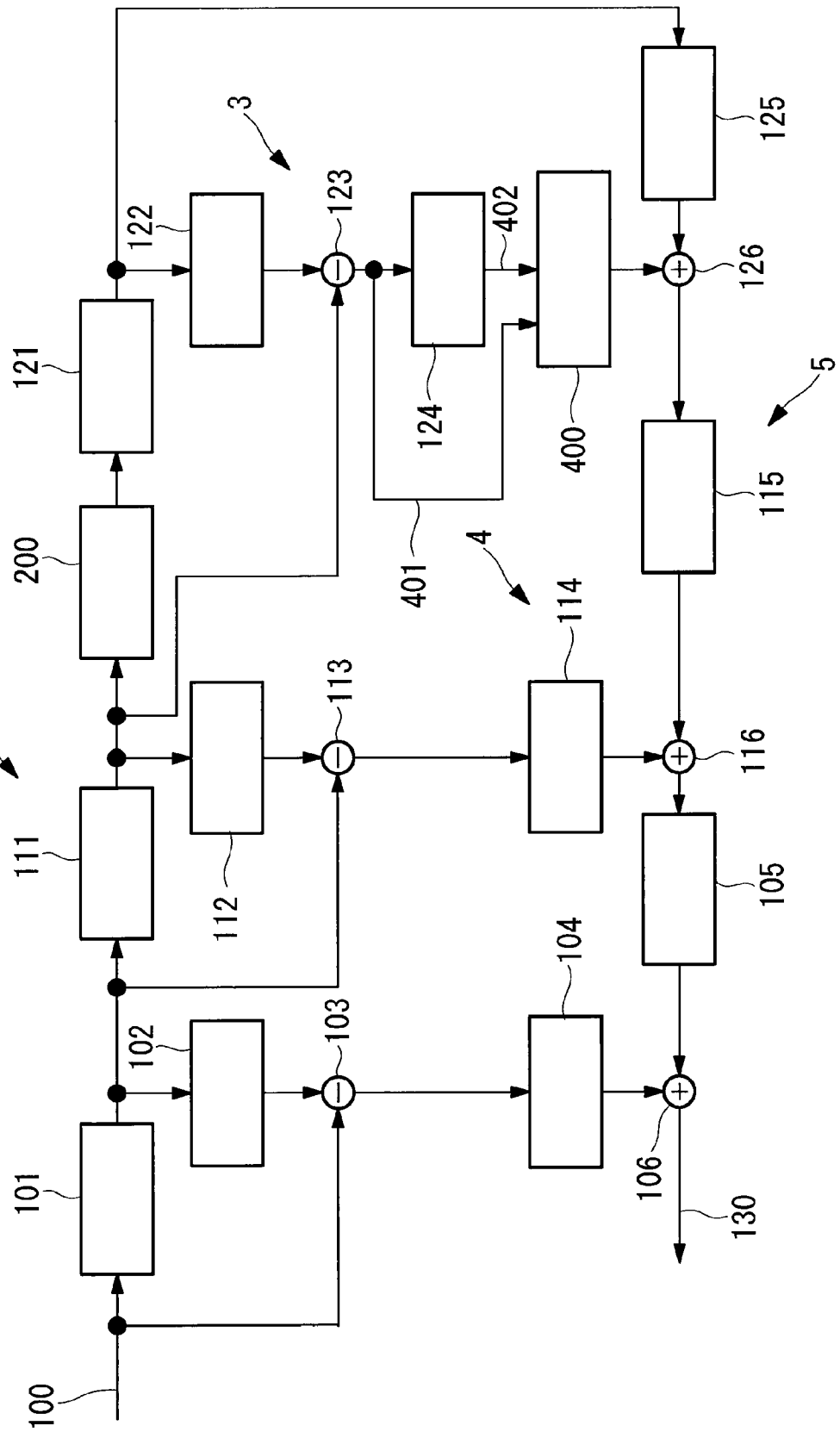
FIG. 7 is a block diagram showing a schematic configuration of an image processing device according to a fifth embodiment of the present invention.

An image processing device according to the present embodiment will be described in detail with reference to FIG. 7.

The image processing device according to the present embodiment has the noise reduction intensity control unit 400 further arranged at the post-stage of the noise reduction unit 124 in the configuration of the image processing device according to the first embodiment shown in FIG. 1.

The noise reduction intensity control unit 400 receives a band image signal 401 before the noise reduction to be input to the noise reduction unit 124 and a band image signal after the noise reduction process by the noise reduction unit 124. The noise reduction intensity control unit 400 mixes such signals to control the noise reduction intensity.

Figure 8:
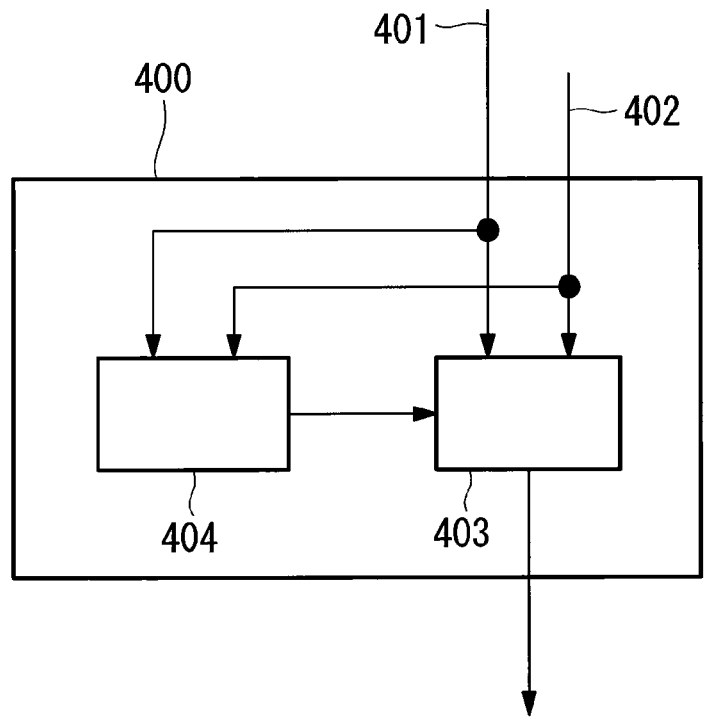
FIG. 8 is a view showing a schematic configuration of a noise reduction intensity control unit shown in FIG. 7.

FIG. 8 shows a configuration of the noise reduction intensity control unit 400. The noise reduction intensity control unit 400 includes a mixing part 403 and a mixing ratio control part 404. The signal 401 before the noise reduction and the signal 402 after the noise reduction are mixed by a weighted average process in the mixing part 403. The intensity of the noise reduction process weakens by reducing the mixing ratio of the signal 402 after the noise reduction, thereby enabling the control of suppressing the residual of the error component that occurs from the pixel expansion. The mixing ratio is calculated by the mixing ratio control part 404.

Figure 9:
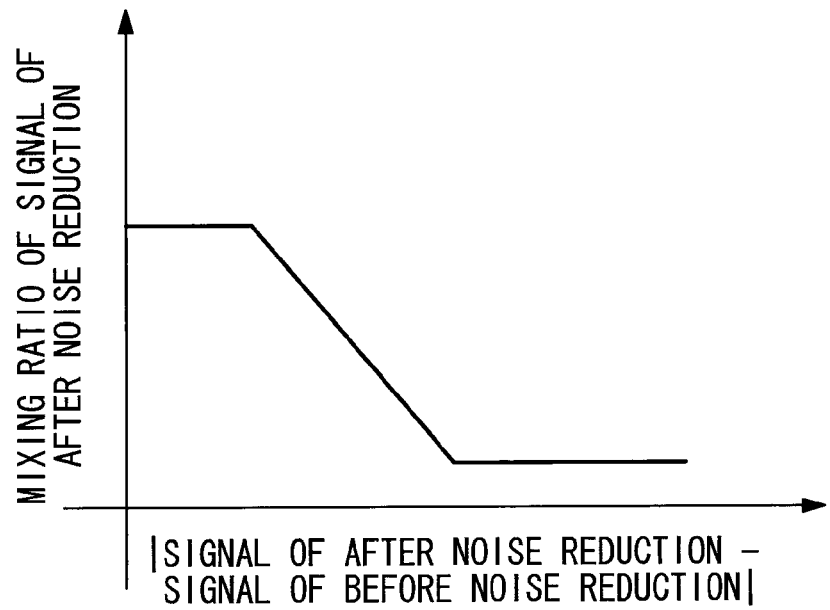
FIG. 9 is a view describing one example of the operation of a mixing ratio control part.

FIG. 9 shows a view describing one example of the operation of the mixing ratio control part 404. The mixing ratio control part 404 calculates the absolute value of a difference between the signal 402 after the noise reduction and the signal 401 before the noise reduction, and controls the mixing ratio according to the absolute value of the difference.

If the absolute value of the difference is small, large pixel value fluctuation does not occur as a result of the noise reduction process, and minor disappearance of the anti-error component that occurs by the pixel expansion is anticipated. Therefore, the mixing ratio of the signal after the noise reduction is set large in this case to enhance the effect of the noise reduction process.

If the absolute value of the difference is large, on the other hand, large pixel value fluctuation occurs as a result of the noise reduction process, and disappearance of the anti-error component that occurs by the pixel expansion is also anticipated. Therefore, the mixing ratio of the signal after the noise reduction is set small in this case to suppress the residual of the error component that occurs by the pixel expansion.

Specifically, the mixing ratio control part 404 includes a table where the mixing ratio and the signal difference are corresponded as shown in FIG. 9, and acquires the mixing ratio corresponding to the absolute value of the difference between the signal 402 after the noise reduction and the signal 401 before the noise reduction from the table, and outputs the acquired mixing ratio to the mixing part 403.

In the present embodiment, the mixing ratio is controlled using the difference value of the pixel values of the signal after the noise reduction and the signal before the noise reduction, as shown in FIG. 9, but this is not the sole case, and the mixing ratio may be controlled using an index representing the amount of fluctuation of the pixel value according to the result of the noise reduction process.

According to the foregoing image processing device of the present embodiment, the intensity of noise reduction can be ex-post adjusted since the noise reduction intensity control unit 400 is arranged at the post-stage of the noise reduction unit 124. The residual of the error component that occurs by the pixel expansion thus can be suppressed.

In the present embodiment, the noise reduction intensity control unit 400 is added with respect to the configuration according to the first embodiment, but in place thereof, the noise reduction intensity control unit 400 may be added with respect to the configuration according to the second embodiment. For instance, in the second embodiment as well, the anti-component of the error component by the pixel expansion tends to mix into the band image signal of each band when any of the inputs of the subtractors 103, 113 and 123 is influenced by the pixel expansion in the respective subtractor. The error component remaining in the output image can be suppressed by suppressing excessive disappearance thereof by the noise reduction intensity control unit 400.

Therefore, the noise reduction intensity control unit 400 is not only limited to being arranged at the post-stage of the noise reduction unit 124, and may be arranged at the post-stage of either one of or both of the noise reduction units 104 and 114.

Sixth Embodiment

A sixth embodiment of the present invention will be described below.

Figure 5:
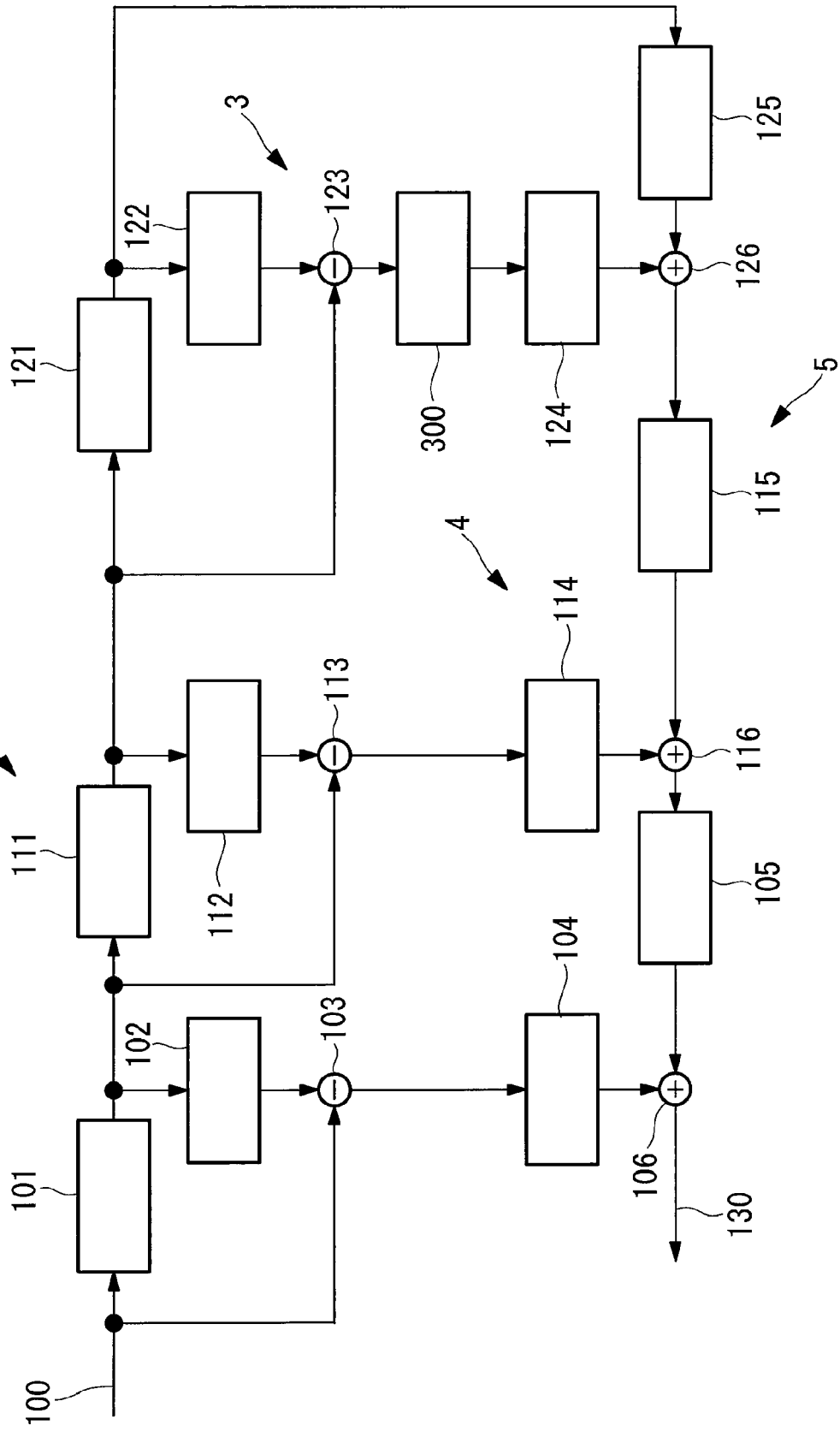
FIG. 5 is a block diagram showing a schematic configuration of an image processing device according to a third embodiment of the present invention.
Figure 10:
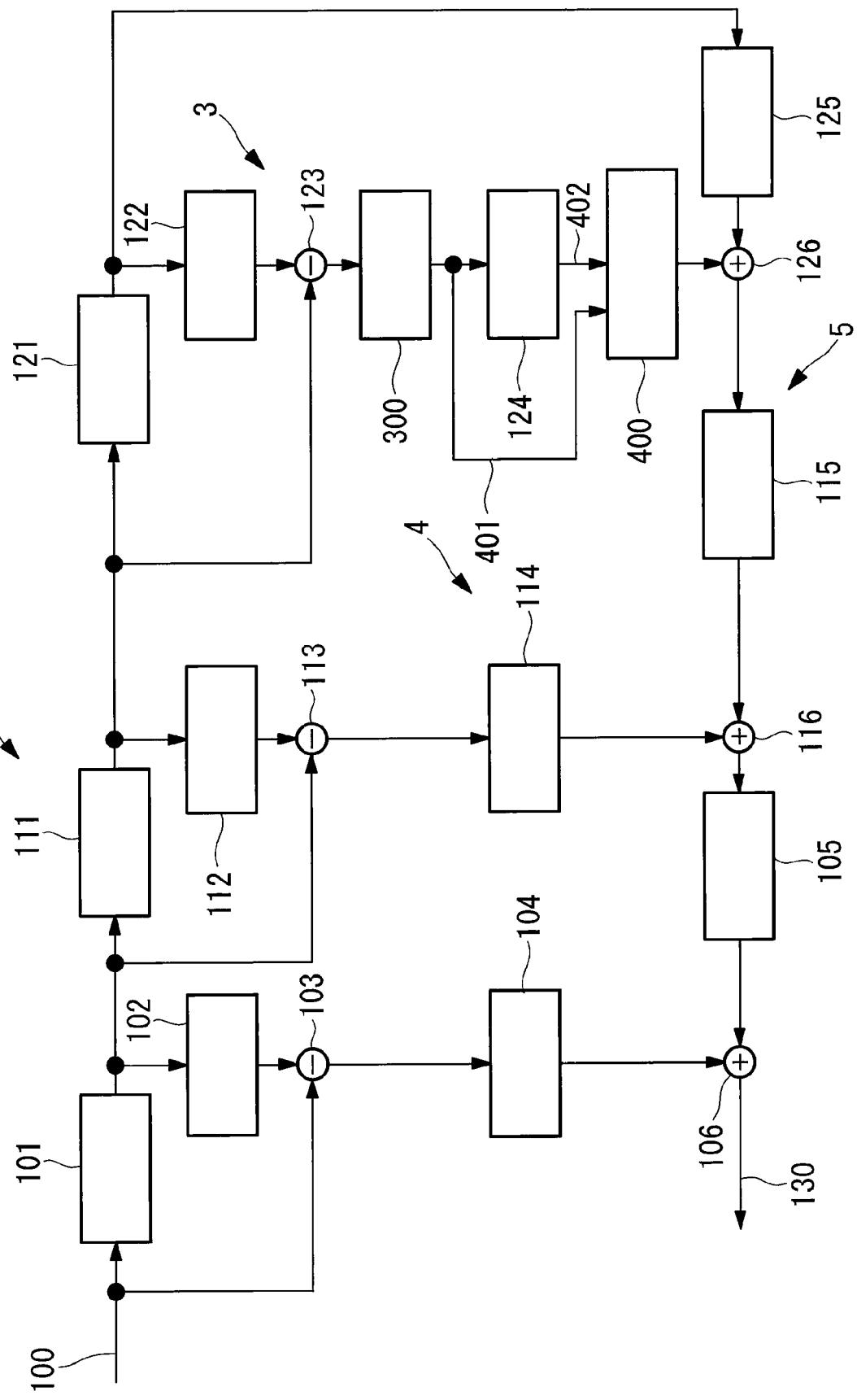
FIG. 10 is a block diagram showing a schematic configuration of an image processing device according to a sixth embodiment of the present invention.

As shown in FIG. 10, the sixth embodiment has a configuration where the noise reduction intensity control unit 400 is further arranged at the post-stage of the noise reduction unit 124 in the configuration of the image processing device according to the third embodiment (see FIG. 5). For instance, if the pixel expansion unit is arranged on the input side of at least one noise reduction unit, the noise reduction process performed at the post-stage is influenced by the pixel expansion, and the image quality may unnaturally degrade.

If the intensity of noise reduction by the noise reduction unit is weak, the degree of degradation is assumed to be weak even if degradation occurs since the intensity of noise reduction is weak. However, if the intensity of noise reduction by the noise reduction processing unit is strong, strong degradation may unfavorably occur.

To respond to such a problem, in the present embodiment, the noise reduction intensity control unit 400 is arranged at the post-stage of the noise reduction unit, which is at the stage the pixel expansion unit is arranged, so that unnatural image quality degradation in the noise reduction process that occurs by the pixel expansion can be suppressed.

In FIG. 10, the pixel expansion unit 300 is arranged at the input side of the noise reduction unit 124 of the third stage, and the noise reduction intensity control unit 400 is arranged at the post-stage of the noise reduction unit 124 in correspondence thereto. With such a configuration, the noise reduction intensity control unit 400 can suppress the unnatural image quality degradation in the noise reduction process that occurs through the pixel expansion by the pixel expansion unit 300.

Seventh Embodiment

A seventh embodiment of the present invention will now be described.

In the image processing device according to the fifth or sixth embodiment described above, the operation of the noise reduction intensity control unit 400 is the same operation regardless of the pixel position to be processed. However, lowering the mixing ratio of the signal after the noise reduction leads to the effect of suppressing the residual of the error component that occurs by the pixel expansion and the effect of suppressing the unnatural image quality degradation in the noise reduction process, and also involves a negative effect such as lowering of noise reduction ability.

In the present embodiment, the operational characteristics of the noise reduction intensity control unit 400 are made differ depending on whether the processing target pixel is close to or distant from the outer peripheral part to alleviate such a negative effect.

Figure 11:
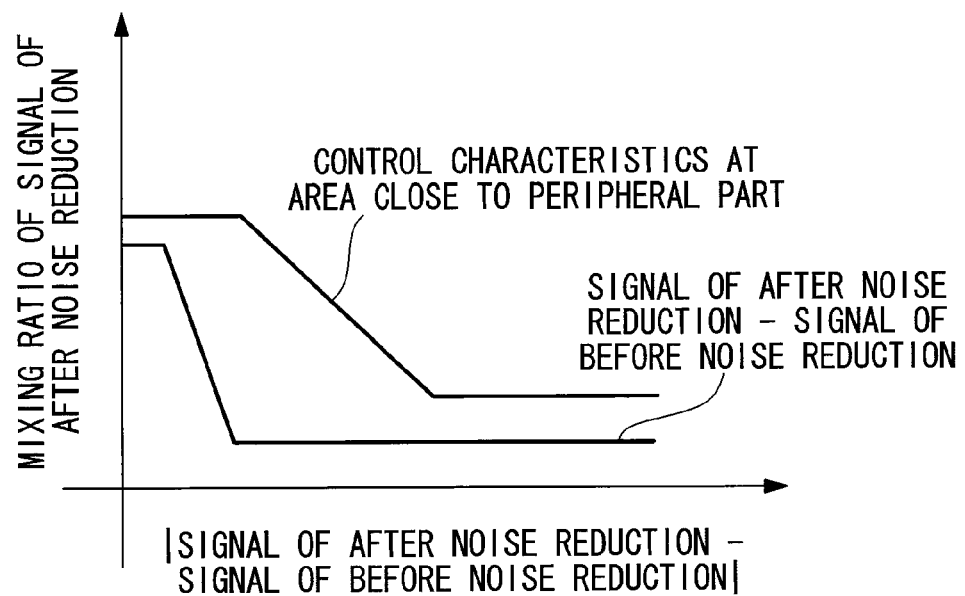
FIG. 11 is a view describing one example of the operation of a mixing ratio control part according to a seventh embodiment of the present invention.

The noise reduction intensity control unit 400 includes a table as shown in FIG. 11, and determines the mixing ratio based on such a table. As shown in FIG. 11, a plurality of different control characteristics are set depending on the position of the pixel to be processed, and different mixing ratios are adopted depending on the position of the pixel to be processed.

Specifically, as shown in FIG. 11, the mixing ratio of the signal after the noise reduction is set low to suppress the residual of the error component or to suppress the unnatural image quality degradation in the noise reduction process if the pixel to be processed is close to the peripheral part.

The mixing ratio of the signal after the noise reduction is set rather high to exhibit the original noise reduction performance if the pixel to be processed is distant from the peripheral part. The characteristics interpolated from such two control characteristics depending on the distance between the pixel to be processed and the peripheral part are the control characteristics.

According to the image processing device of the present embodiment, the operational characteristics of the noise reduction intensity control unit 400 are varied depending on whether the pixel to be processed is close to or distant from the peripheral part, and thus the lowering of noise reduction ability can be alleviated.

Application Examples

Figure 12:
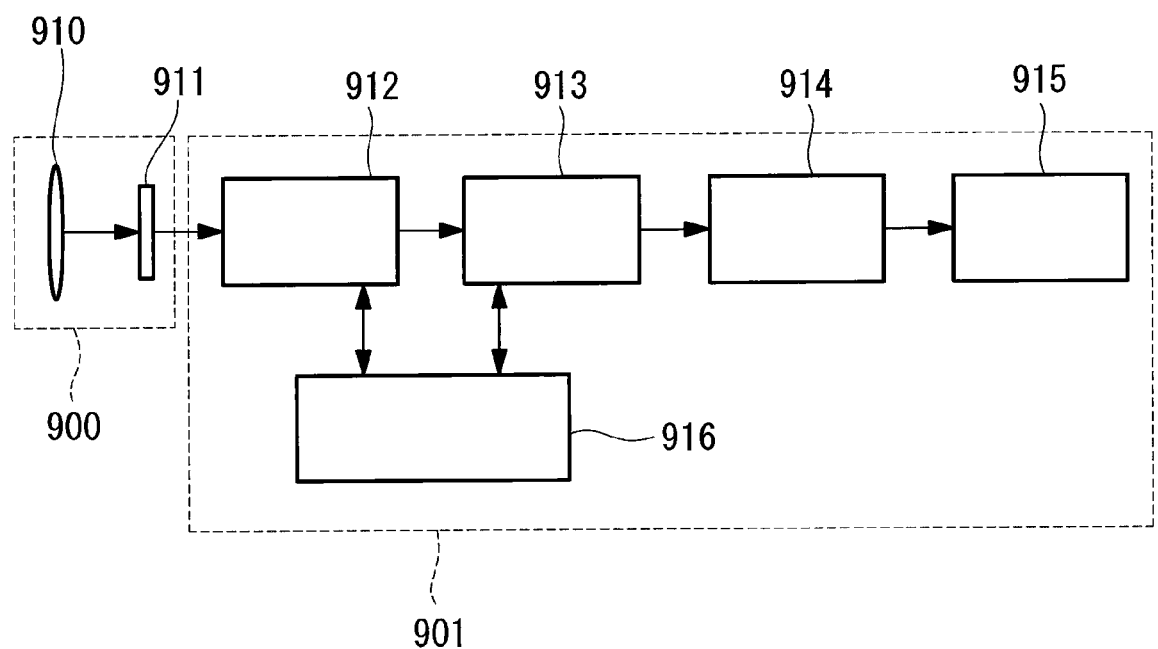
FIG. 12 is a view showing an overall configuration example when the image processing device according to any one of the embodiments is applied to an imaging system such as a digital camera.
Figure 13:
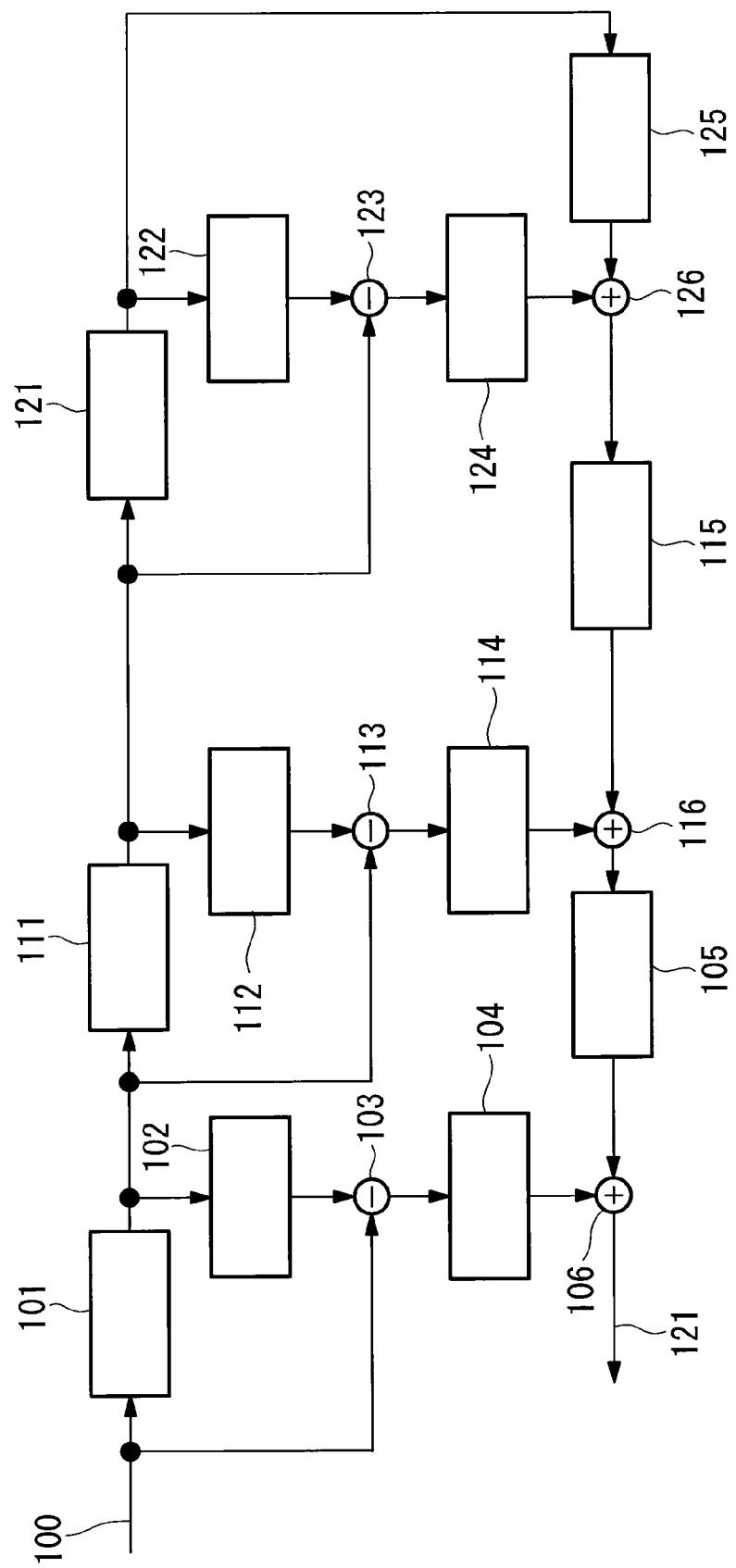
FIG. 13 is a view showing one configuration example for realizing a noise reduction process using the multiresolution transformation by the Laplacian pyramid of the prior art.

FIG. 12 is a view showing an overall configuration example when the image processing device according to any one of the embodiments described above is applied to an imaging system such as a digital camera.

As shown in FIG. 12, the imaging system includes an imaging unit 900 for imaging a subject, and a processing device 901 for processing the image acquired by the imaging unit 900. The imaging unit 900 includes a lens system 910 and an imaging element 911 such as a CCD. The processing device 901 includes an image processing unit 912, a noise reduction unit 913, an image compression unit 914, a recording medium 915, a frame memory 916, and the like.

In such a configuration, the image signal imaged by the imaging element 911 through the lens system 910 is subjected to a white balance process, an edge enhancement process, a color signal process and the like in the image processing unit 912, and then the noise reduced in the noise reduction unit 913. The image signal where the noise is reduced is compressed to the JPEG format and the like in the image compression unit 914, and saved in the recording medium 915 such as a memory card. The noise reduction unit 913 is applied with the noise reduction method described in the first to seventh embodiments of the present invention. The input image 100 is appropriately stored in the frame memory 916, and accessed by the image processing unit 912 and the noise reduction unit 913.

According to such an imaging system, the lowering in speed due to increase in the number of processing pixels and the influence on the image quality such as discontinuity by the pixel expansion can be suppressed when performing the noise reduction process.

In each embodiment described above, the processes by hardware are premised on in the image processing device, but such a configuration is not the sole case. For instance, a configuration of separately processing in software may be adopted. In this case, the image processing device includes a main storage device such as a CPU and a RAM, and a computer readable recording medium recorded with a program for implementing all or a part of the above processes. The CPU reads out the program recorded in the recording medium and executes the processing and calculation process of information to implement the process similar to the image processing device.

The computer readable recording medium includes a magnetic disc, a magnetic optical disc, a CD-ROM, a DVD-ROM, a semiconductor memory, and the like. The computer program may be distributed to the computer through a communication line, and the computer receiving the distribution may execute the relevant program.

What is claimed is:

1. An image processing device comprising:
    a filtering unit comprising a plurality of filtering unit stages for filtering an input image;
    a plurality of band image signal generating units for generating a plurality of band image signals having different frequency bands from each other from an output image of the filtering unit;
    a noise reduction processing unit for performing a noise reduction process of reducing a noise component contained in the plurality of band image signals generated by the band image signal generating units; and
    a plurality of image synthesizing units for synthesizing the plurality of band image signals subjected to the noise reduction process;
    wherein the image processing device includes a first pixel expansion unit for performing a pixel expansion process of expanding pixels at an outer peripheral part of an image input to one of the plurality of filtering unit stages other than a first stage of the filtering unit, or an image output from one of the plurality of band image signal generating units.

2. The image processing device according to claim 1, further comprising a second pixel expansion unit, arranged on an input side of the first stage of the filtering unit, for performing the pixel expansion process of expanding the pixels at the outer peripheral part of the input image.

3. The image processing device according to claim 1, wherein at least one of the plurality of filtering unit stages reduces the input image or an output image of a previous one of the filtering unit stages.

4. The image processing device according to claim 1, wherein the first pixel expansion unit is arranged on an input side of a final stage of the filtering unit.

5. The image processing device according to claim 1, further comprising a second pixel expansion unit for performing the pixel expansion process of enlarging the pixels at the outer peripheral part of the image of a band image signal in which at least a band frequency is second lowest from among the plurality of band image signals output from the plurality of band image signal generating units.

6. The image processing device according to claim 1, further comprising:
    a noise reduction intensity limiting unit for limiting an intensity of noise reduction in the noise reduction processing unit;
    wherein the noise reduction intensity limiting unit includes a mixing part for mixing a band image signal before the noise reduction process by the noise reduction processing unit and the band image signal after the noise reduction process, the noise reduction intensity being controlled by controlling a mixing ratio.

7. The image processing device according to claim 6, wherein the mixing ratio is adjusted so that a mixing proportion of the band image signal after the noise reduction at the outer peripheral part of the image is smaller than at a portion other than the outer peripheral part of the image.

8. An imaging system comprising:
    an imaging unit for acquiring an image; and
    the image processing device according to claim 1 for performing image processing with respect to the image acquired by the imaging unit.

9. An image processing method comprising:
    performing filtering over plural times with respect to an input image;
    generating a plurality of band image signals having different frequency bands from each other from a plurality of output images obtained by the filtering of plural times;
    performing a pixel expansion process of expanding pixels at outer peripheral parts of the plurality of output images obtained by the filtering and at least one image of the plurality of band image signals;
    performing a noise reduction process of reducing a noise component contained in the plurality of band image signals; and
    synthesizing the plurality of band image signals subjected to the noise reduction process.

10. The image processing method according to claim 9, wherein the pixel expansion process of expanding the pixels at the outer peripheral part of the image is performed with respect to the input image.

11. A computer readable storage device having an image processing program stored thereon for causing a computer to execute functions comprising:
    performing filtering over plural times with respect to an input image;
    generating a plurality of band image signals having different frequency bands from each other from a plurality of output images obtained by the filtering of plural times;
    performing a pixel expansion process of expanding pixels at outer peripheral parts of the plurality of output images obtained by the filtering and at least one image of the plurality of band image signals;
    performing a noise reduction process of reducing a noise component contained in the plurality of band image signals; and
    synthesizing the plurality of band image signals subjected to the noise reduction process.

12. The computer readable storage device according to claim 11, wherein the pixel expansion process of expanding the pixels at the outer peripheral part of the image is performed with respect to the input image.

* * * * *